(12) United States Patent
Korn et al.

(10) Patent No.: US 9,543,712 B2
(45) Date of Patent: Jan. 10, 2017

(54) INTRINSICALLY SAFE WIRELESS DONGLE FOR A FIELD DEVICE

(71) Applicant: Endress + Hauser Conducta Gesellschaft für Mess- und Regeltechnik mbH + Co. KG, Maulburg (DE)

(72) Inventors: Michael Korn, Marktoberdorf (DE); Bjorn Haase, Stuttgart (DE); Stefan Robl, Hunxe (DE); Tilman Benkert, Stuttgart (DE); Gunter Jahl, Gerlingen (DE)

(73) Assignee: Endress+Hauser Conducta Gmbh+Co. KG, Gerlingen (DE)

( * ) Notice: Subject to any disclaimer, the term of this patent is extended or adjusted under 35 U.S.C. 154(b) by 0 days.

(21) Appl. No.: 14/799,944

(22) Filed: Jul. 15, 2015

(65) Prior Publication Data
US 2016/0104979 A1    Apr. 14, 2016

(30) Foreign Application Priority Data
Jul. 23, 2014   (DE) ........................ 10 2014 110 385

(51) Int. Cl.
| | | |
|---|---|---|
| *H04B 7/00* | (2006.01) | |
| *H01R 13/66* | (2006.01) | |
| *G08C 17/00* | (2006.01) | |
| *H04W 12/00* | (2009.01) | |
| *G06F 21/60* | (2013.01) | |
| *H01R 13/622* | (2006.01) | |
| *H04B 1/00* | (2006.01) | |
| *H04W 12/02* | (2009.01) | |
| *H04W 4/00* | (2009.01) | |
| *H01R 12/57* | (2011.01) | |

(52) U.S. Cl.
CPC ......... *H01R 13/6691* (2013.01); *G06F 21/602* (2013.01); *G08C 17/00* (2013.01); *H01R 13/622* (2013.01); *H01R 13/6625* (2013.01); *H04W 12/00* (2013.01); *H01R 12/57* (2013.01); *H04W 4/008* (2013.01); *H04W 12/02* (2013.01)

(58) Field of Classification Search
CPC ............ H04M 1/72527; H04M 1/7253; H04M 1/72533
USPC ................................................ 455/41.2–41.3
See application file for complete search history.

(56) References Cited

U.S. PATENT DOCUMENTS

| | | | | |
|---|---|---|---|---|
| 7,233,745 B2* | 6/2007 | Loechner | ........... | G05B 19/4185 340/539.1 |
| 8,200,852 B2* | 6/2012 | Liu | ..................... | G06F 13/4081 370/464 |

\* cited by examiner

*Primary Examiner* — Lee Nguyen
(74) *Attorney, Agent, or Firm* — Mark A. Logan; PatServe

(57) ABSTRACT

A wireless dongle for use in the potentially explosive area for an automation field device to connect to an electrical interface of the field device, having a wireless circuit for sending and receiving wireless signals and a connector element. The wireless dongle can be detachably fitted to the electrical interface by means of the connector element. The connector element has several contact elements, wherein the contact elements are attached to a printed circuit board in the wireless dongle, that a first contact element is used to supply the wireless dongle with energy, that an energy buffer on the printed circuit board is provided which is downstream of the first contact element. The connector element has a second contact element which is used to transmit data between the field device and the wireless dongle, that in each case there is at least one limiting resistor is downstream of the first contact element and the second contact element, and that the resistors and the energy buffer of the wireless dongle are encapsulated by means of a potting compound.

14 Claims, 2 Drawing Sheets

INTRINSICALLY SAFE WIRELESS DONGLE FOR A FIELD DEVICE

TECHNICAL FIELD

The invention concerns a wireless dongle, which is intrinsically safe with regard to explosion protection, for an automation field device to connect to an electrical interface of the field device, having a radio circuit for sending and receiving radio signals and a connector element, wherein the wireless dongle can be detachably fitted to the electrical interface by means of the connector element.

BACKGROUND DISCUSSION

In automation technology, field devices, in particular so-called two-wire field devices, are often utilized in areas in which the power consumption of a field device is restricted to a predetermined value. An example of this is a potentially explosive area in an industrial manufacturing or process plant in which automation devices are used. In areas such as these, limit values are prescribed for the maximum power consumption of a field device. The relevant provisions in this regard are determined by various organizations and associations at a national and international level. Two-wire field devices are particularly suited for use in such areas due to their limited power consumption.

Various types of protection, such as protection by means of pressure-encapsulated enclosures or encapsulation in sand, potting compound, or oil, whereby explosion protection is ensured by means of constructive measures which aim to prevent conductive connections from protruding into the potentially explosive medium, are known for use in the explosion-protected area.

Intrinsically safe circuits are here generally subject to stringent restrictions with regard to operating voltage and the electrical power available to operate the circuit. The measures for limiting the ignition energy in the event of a fault also limit the performance values available for normal operation and, as a rule, prevent the operation of a circuit which requires high short-duration peak currents to function.

Automation field devices are widely used in industrial plants. For example, field devices, which are used to record and/or influence process variables, are widely used in process technology, as well as in automation technology. Measuring devices, such as level measuring devices, flow meters, pressure and temperature measuring devices, pH meters, conductivity meters etc., are used for recording process variables and record the corresponding process variables for level, flow, pressure, temperature, pH and conductivity. Actuators, such as valves or pumps, are used for influencing the process variables by which, for example, the flow rate of a liquid in a pipe or the fill level of a medium in a container is changed. In principle, a field device is any device which is used close to a process and which provides or processes process-relevant information. A number of such field devices is offered and sold by the Endress+Hauser group of companies. All types of measuring devices and actuators should therefore be subsumed under the term field device as used in conjunction with the invention. Furthermore, the term field device also includes, for example, a gateway, a wireless adapter or other bus subscribers which are or can be integrated into a bus system.

In this connection, the necessity of commissioning and the configuring of field devices should be noted. For example, when a field device is calibrated, a communication path needs to be established from an operator panel to the field device itself or between field devices. However, this task can require considerable effort, particularly in potentially explosive plants. It is important to minimize the non-productive time of a plant or a section of a plant caused by a configuration or maintenance process. For this reason, wireless solutions, i.e. the use of wireless technologies for communication between field devices or between an operator panel and a field device, are to be considered preferable to a cable connection to an industrial interface of a field device.

A wireless field device that can be used in potentially explosive areas is known from German Patent, DE 600 18 072 T2. In a preferred embodiment, which is disclosed in this publication, the reduced availability of power or energy is taken into consideration. An energy buffer, which pre-stores energy during the period in which the transmitter unit is not sending out any radio signals, is provided in the field device to provide the energy required for sending out wireless signals. It is further provided for the wireless to be stopped when the energy supply is no longer sufficient. This allows error-free data transmission which would not otherwise be possible were a radio transmission to be terminated. However, the field device must be completely redesigned to enable wireless communication.

In accordance with prior art, many different wireless dongles are known which can create or expand the wireless capability of a field device. For example, USB wireless dongles exist which can be connected to a USB interface of a computer and used for wireless communication with other field devices and/or control panels. However, such wireless dongles are not suitable in any way for potentially explosive areas in industrial plants since the performance characteristics and Ex-safety properties do not meet the requirements described above.

SUMMARY OF THE INVENTION

The problem underlying the invention is to find an intrinsically safe wireless dongle for use in a potentially explosive area which can be connected to an existing industrial interface of a field device, in particular a two-wire field device.

The problem is solved in that the connector element has several contact elements, wherein the contact elements are connected to a printed circuit board in the wireless dongle, a first contact element is used to supply the wireless dongle with energy, an energy buffer is provided on the printed circuit board which is downstream of the first contact element, the connector element has a second contact element which is used to transmit data between the field device and the wireless dongle, in each case there is at least one limiting resistor always downstream of the first contact element and at least one limiting resistor downstream of the second contact element, an encryption unit is integrated in the wireless dongle which is used to secure a wireless channel (20) against being tapped and/or manipulated, and the resistors, the encryption unit and the energy buffer are all encapsulated by means of a potting compound.

Protection types, such as pressure-encapsulated enclosures, or sand, potting compound or oil encapsulation in which explosion protection is ensured by means of constructive measures, are not preferred for a wireless dongle since such a unit should, in accordance with its intended use, be designed conductively with contact surfaces by means of which the dongle can be attached to an interface.

An alternative to this application case is provided by a so-called intrinsically safe circuit design which ensures protection from sparking in that currents, power and voltage on the conductors exposed to the potentially explosive medium are limited to a safe value.

The limiting resistors in conjunction with the potting compound prevent the risk of sparking. The electrical interface therefore meets the requirement regarding the intrinsic safety of the field device. Sparks can occur if the voltage for a predetermined distance between two elements exceeds a defined threshold value. In air and under standard conditions (for example, atmospheric pressure), approximately 3000 volts per millimeter are required before electric flashover of a spark will occur. Sparking is, therefore, avoided by limiting the voltage. This requires, for example, the use of resistors. When an energy buffer, in particular, is used, the placement and the size of these resistors is crucial as the energy collected in the energy buffer may potentially be sufficient to create an ignition spark. A potting compound is used for further reduction of the risk of sparking since the electrical flashover voltage of a potting compound is considerably higher than that of air. By using a suitable potting compound, the use of even large energy buffers in the intrinsically safe environment is permitted, even if the amount of energy in the energy buffer exceeds the limit values for the ignition curve. Here, it is not relevant to the protective effect whether the enclosing potting compound is applied to the printed circuit board via potting or an injection-molding process, e.g. a so-called hot melt process or classic plastic injection molding. If an injection-molding process is used, the potentially higher process temperatures and process pressures may render it advantageous to initially protect the printed circuit board of the wireless dongle from the higher temperatures and process pressures of the injection-molding process via an initial low-temperature potting.

The advantage of using an injection-molding process, as is also used for ordinary plastic casings, is that materials can be used which have high chemical or temperature resistances which e.g. are not usually achieved by casting resins which can be used at low temperatures. In this case, the potting material can also take on the function of the enclosing casing in addition to the function of encapsulation. Potting materials based on silicone, polyurethane, and/or epoxy resins are preferably used as the potting compound in the wireless dongle. For this purpose, for example, a silicone rubber under the trade name Silgel from Wacker, polyurethane potting compounds under the trade names Wevorpur 403 FP from WEVO-CHEMIE GmbH and/or Wepuran VU 4452/61 HE from Lackwerke Peters GmbH+Co KG, and epoxy resins under the trade name Stycast-2651 from Henkel AG & Co. KGaA could be obtained in 2014.

Solutions are known from the prior art in which, for example, a light-emitting diode is enclosed in a connector via an injection-molding process.

According to the invention, the potting material in combination with the resistive limiting resistors which are also encapsulated, performs a protective task in the area of explosion protection, as well as protecting against environmental influences, such as moisture.

In a development of the wireless dongle according to the invention, a DC converter is provided which is downstream of the energy buffer, wherein the DC converter is used for controlling the voltage made available to the wireless circuit. The DC converter is also used to keep the voltage constant even when the energy buffer's voltage fluctuates, e.g. as a result of energy being extracted from the buffer during a wireless transmission. The use of a DC converter also makes it possible to adapt wireless circuits which require different operating voltages.

In an advantageous embodiment, the energy buffer is operated with a first operating voltage, the wireless circuit is operated with a second operating voltage, and the DC converter converts the first operating voltage to the second operating voltage. In the event that the operating voltages of the energy buffer and the wireless circuit are fixed, a simple, non-variable voltage converter can be used.

In an advantageous development of the wireless dongle according to the invention, a first monitoring arrangement is provided for monitoring the energy in the energy buffer. The first monitoring arrangement has a switch between the energy buffer and the wireless circuit which is initially in an open state. The switch is closed when the energy in the energy buffer exceeds a prescribed threshold value. In this way, an initial amount of energy is introduced into the energy buffer. In other words, after the wireless dongle has been connected to the interface, switching on wireless operation of the wireless circuit of the wireless dongle will be delayed as long as is necessary until a predetermined amount of energy can be prestored. Without this monitoring arrangement, it cannot be ensured that the energy buffer is able to collect sufficient energy during ongoing operation of the wireless circuit with the consequence that not enough energy is available for sending out wireless signals, or the wireless circuit does not start correctly.

In a development of the wireless dongle according to the invention, a second monitoring arrangement is provided which monitors the energy supply of the wireless dongle and, in the event that the energy available for operating the wireless operation of the wireless dongle is below a prescribed threshold, switches off wireless operation. In this way an error-free transmission of data is enabled by means of wireless signals emitted. In the event that there is not enough energy available, a data transmission process may be canceled. This can lead to errors, which are avoided by means of the second monitoring arrangement.

According to a further development of the wireless dongle according to the invention, the second contact element is part of a first data transmission line which transmits data from the wireless dongle to the field device, and a third contact element is provided which is part of a second data transmission line which transmits data from the field device to the wireless dongle, and a limiting resistor is downstream of the third contact element. Electrical interfaces can have two contacts which each transfer data in only one direction. The wireless dongle is, therefore, designed advantageously such that the requests are adapted to the existing electrical interface. This avoids having to develop, produce and supply an additional adapter.

In an advantageous development of the wireless dongle according to the invention, the data transmission lines on the second and third contact elements have a first voltage level, the data transmission lines on the wireless circuit have a second voltage level, and a level converter converts the voltage level. The level converter acts as a translator in that it enables communication between the field device and the wireless dongle. A level conversion from a first voltage level to a second voltage level is provided for this purpose. Alternatively, the level converter is able to carry out a conversion in a variable manner depending on requirements. Furthermore, the level converter is also used to compensate for the impact of the resistors on the voltage behavior of a signal of the data transmission lines. This can, for example, be the smoothing of a square wave signal which, for example, reduces the edge steepness of the square wave signal.

In an advantageous embodiment, the first operating voltage corresponds to the first voltage level, and the second operating voltage corresponds to the second voltage level.

According to a preferred embodiment of the wireless dongle according to the invention, a fourth contact element is provided which is connected to ground. Furthermore it is intended that the energy buffer is a capacitor, wherein a first electrode of the capacitor is connected to a node downstream of the first contact element, and a second electrode of the capacitor is connected to the fourth contact element. A cost-effective design of an energy buffer can, therefore, be realized.

In a preferred embodiment, the wireless dongle has a hermetically sealed enclosure and, furthermore, the enclosure is at least partially filled with the potting compound. The wireless dongle is, therefore, additionally protected against moisture and chemicals. This embodiment also creates advantages with regard to the production of a wireless dongle since potting is simplified. Production can, therefore, be effected more quickly and more cost-effectively.

In summary, an intrinsically safe wireless dongle is created due to the described characteristics. The limiting resistors in the energy supply and data lines ensure that, even in the event of a fault, the wireless dongle cannot generate dangerous signals which would be apt to result in electrical ignition. The poor signal quality on the data lines, which is caused by limiting resistors introduced into the data lines, can be corrected by means of the level converter. The high peak currents, which are limited by the limiting resistor in the energy supply but which are required for wireless operation, are provided by the energy buffer encapsulated by potting. Finally, monitoring circuits permit reliable operation of the wireless dongle even in the event of the energy buffer temporarily having a charge level which permits the high peak currents required for wireless operation.

In an advantageous embodiment of the wireless dongle according to the invention, an antenna is integrated into the wireless dongle, and the energy buffer, wireless circuit and antenna are all encapsulated via the potting compound.

In an alternative embodiment, an antenna is integrated into the wireless dongle whose antenna feeder is separated from the energy buffer by at least one blocking capacitor, wherein the at least one blocking capacitor is encapsulated together With the energy buffer and wireless circuit via the potting compound. It not therefore mandatory for the antenna to be encapsulated as well.

In an advantageous embodiment, the antenna is designed in such a way that, as part of the wireless dongle, it also acts as a gripping element which allows the process of insertion and, where necessary, locking onto the contact receiver of the field device to be executed very ergonomically, for example, as a result of the surrounding enclosure or the extruded encapsulated enclosure having suitable ribbing for optimum grip.

In an advantageous embodiment, the position of the antenna in the wireless dongle is identified by an appropriate pictogram. The advantage of this is that the user is thereby shown which part of the wireless dongle is important for the wireless function. In this way, an indication can be provided, for example, that optimally no metal pipe or cable be positioned in the immediate surroundings of this part of the wireless dongle which could negatively influence transmission and reception properties.

In an advantageous embodiment, an encryption unit is integrated in the wireless dongle which is used for securing the wireless channel against being tapped and/or manipulated.

In an advantageous embodiment, the encryption unit has a non-volatile memory in which information, such as passwords or keys, is stored such that the wireless dongle can secure the wireless channel against being tapped, unauthorized access or being manipulated, without further security-related functions being required in the field device. Consequently the encryption unit, which is mounted on a circuit card, contains a non-volatile memory in which security-relevant data, such as passwords or codewords, are stored. The wireless dongle, therefore, also performs the function of a security dongle as is known, for example, in the form of a USB dongle in the field of computer applications for the security protection of bank transfers. In this case, the potting material also advantageously performs a protective function which makes it hard for an attacker to gain non-destructive access to the memory of the circuit card and, where necessary, prevents unauthorized access to the security-relevant data saved thereupon.

In an advantageous embodiment, the circuit card is also designed such that it performs encryption and decryption operations, thereby protecting the wireless connection against being tapped, unauthorized access and being manipulated without requiring the involvement of the field device.

In an advantageous embodiment, as a result of the limited energy budget, in particular encryption methods based on elliptic curves are used, in particular curves in the so-called Montgomery-Edwards or Twisted Edwards form.

In this connection, the energy storage system also performs the function that the power-consumption time curve of the encryption unit cannot be recorded when performing an encryption operation on the external contact surfaces because said storage system is smoothed by the energy buffer. This is advantageous because clues to the key used could possibly be obtained from the power-consumption time curve during an encryption operation, e.g. as a result of one key bit being processed after the other, and the demand for electricity with a logical "1" level being different from that with a logical "0" level.

BRIEF DESCRIPTION OF THE DRAWINGS

The invention is explained in more detail by means of the following figures. These show:

FIG. 1a: is a schematic plan view of an embodiment of the wireless dongle according to the invention;

FIG. 1b: is a schematic longitudinal section of the wireless dongle shown in FIG. 1a;

DETAILED DESCRIPTION IN CONJUNCTION WITH THE DRAWINGS

Figures 1A, 1B:
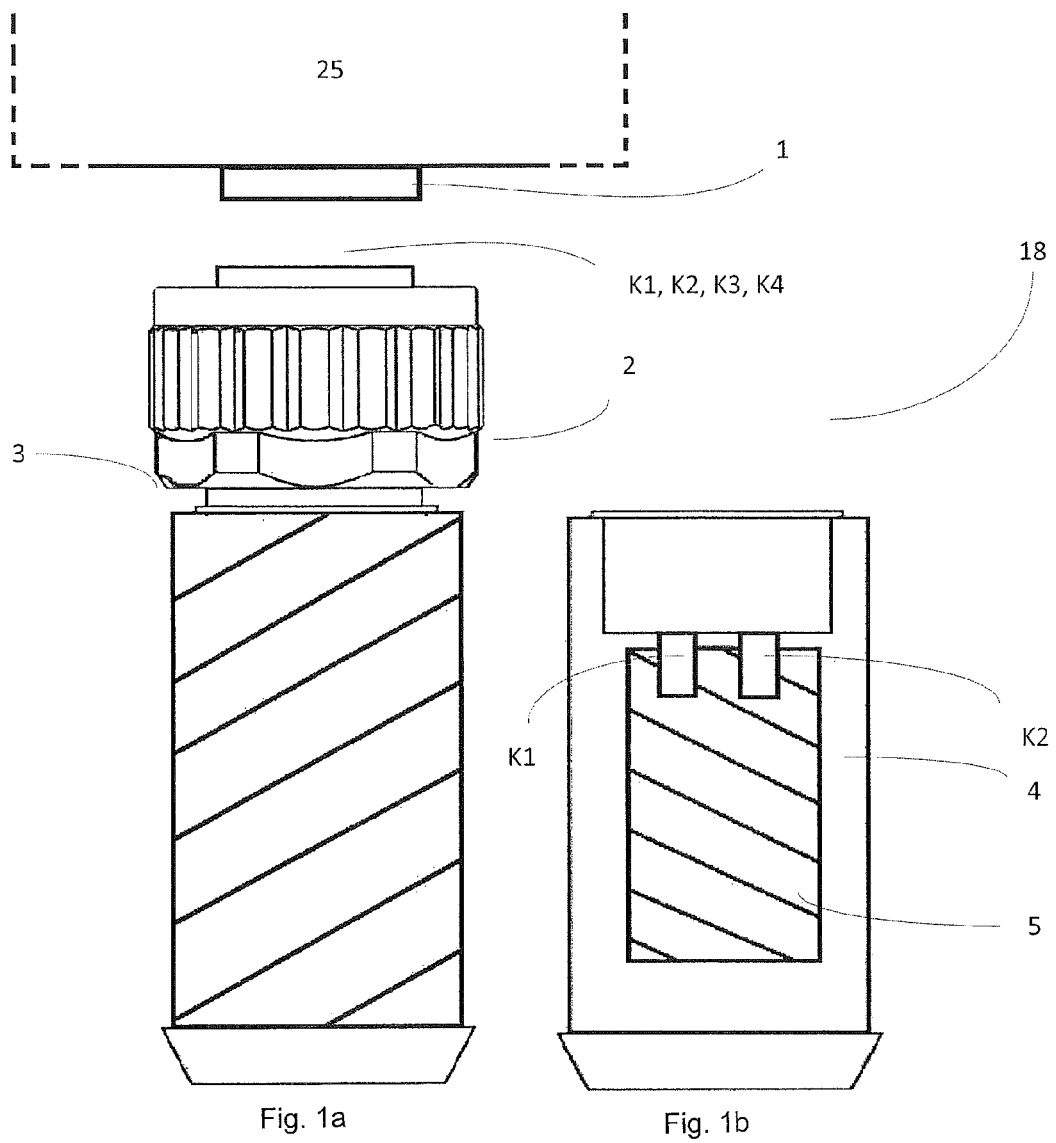

FIG. 1a shows a schematic plan view of an embodiment of the wireless dongle 18 according to the invention. The connector element 1 shown here can be fitted detachably to an electrical interface 1 of a two-wire field device 25. A rotatable cap 2 is shown with an internal thread which is not shown. After the wireless dongle 18 has been plugged into the electrical interface 1, the cap 2 can be screwed onto a provided external thread of interface 1. The wireless dongle 18 is thus attached to the two-wire field device 25. The threaded connection is also used to reliably create an electrical contact between the wireless dongle 18 and the electrical interface 1. The connector element 1 has (not visible in FIG. 1a) four contact elements K1, K2, K3, K4. The hermetically sealed enclosure 3 shown creates an interior space 4 in the wireless dongle 18 in which a section of the contact elements K1, K2, K3, K4, a printed circuit board 5 and various circuit components R1, 15, 7, SoC, etc. are positioned.

FIG. 1b shows a schematic longitudinal section of the wireless dongle 18 shown in FIG. 1a. Two of the total of four contact elements K1, K2 are shown, wherein the contact elements K1, K2 are in contact with the printed circuit board 5 in the interior space 4 of the enclosure 3.

Figure 2:
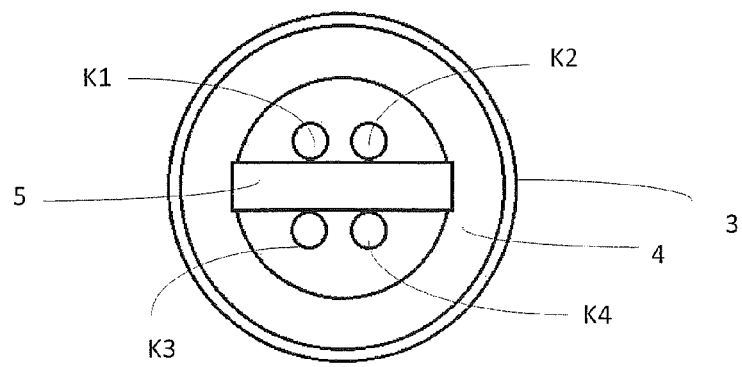
FIG. 2: is a cross-section of the wireless dongle shown in FIG. 1.

FIG. 2 shows a cross-section of the wireless dongle shown in FIG. 1, wherein the four contact elements K1, K2, K3, K4, the printed circuit board 5 and the enclosure 3 are visible. The embodiment shown in FIGS. 1 and 2 is merely a possible example of the structural form of the wireless dongle 18 according to the invention. A person skilled in the art would understand that the elements shown here can be assembled in many different mechanical forms without great effort. The claimed invention is, therefore, not to be understood as being limited to this embodiment.

Figure 3:
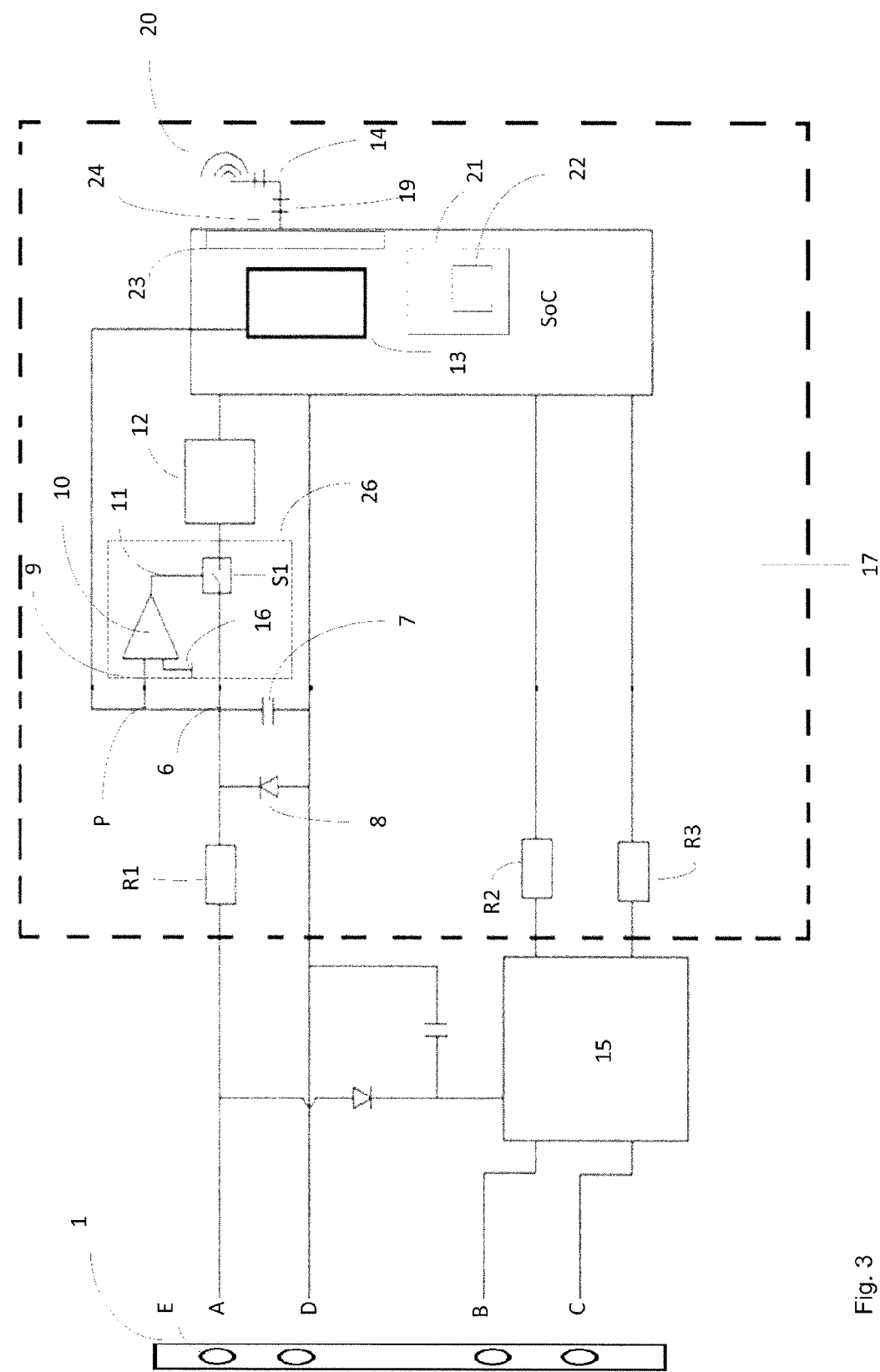
FIG. 3: is a block diagram of the wireless dongle according to the invention.

FIG. 3 shows a block diagram of the wireless dongle according to the invention. In particular, the circuit which is situated on the printed circuit board 5 is shown in more detail. Four connections A, B, C, D are provided which are used for connecting to the contact elements K1, K2, K3, K4 of the wireless dongle 18. The first connection A leads to a first resistor R1. The resistor R1 together with the Zener diode 8 creates a safety barrier for the purpose of explosion protection. A node 6 can be found in a position downstream of the first resistor R1. A capacitor 7 and a circuit S1, as well as a monitoring path P, are connected to the node 6. The capacitor 7 serves as an energy buffer 7 and functions in the manner described below.

Connection A or the corresponding contact element K1 are attached to a power supply connection E of the electrical interface 1. The capacitor 7 starts a charging process once there is voltage present at connection A. The initial position of switch S1 is arranged so that no electrical current can flow across the switch S1. Switches of this type are known in connection with the term N.O. switch ("normally open").

The monitoring path P leads to a first input 9 of a comparator 10. The output 11 of the comparator 10 leads to the switch S1. The output 11 of the comparator 10 is used for switching on the switch S1 as soon as the applied voltage at the comparator 10 from the monitoring path P exceeds a specific threshold value. At the moment when the threshold value is exceeded, an output signal from the comparator 10 switches from a first voltage level to a second voltage level, thus activating the switch S1. The switch S1 is then closed. The switch S1 is thus in an open state up to the point when the Voltage across the capacitor 7 reaches a prescribed threshold value.

The use of such a threshold value is advantageous for wireless circuits in particular which can work alternatively in a "sleep mode" or an "awake" operating mode. A characteristic feature of the transition from sleep mode to operating mode is that high short-duration current peaks are often required, without which the waking process cannot reliably occur.

Once the threshold of the energy buffer 7 is reached, the energy which was stored in the capacitor 7 up to this point will be sufficient to "wake up" a wireless circuit 23 on the SoC printed circuit board and to operate the wireless circuit 23 for a prescribed period of time. This principle is advantageous, in particular, for the start-up of the wireless circuit 23, i.e. in particular also for the point in time when the wireless dongle 18 is contacted on the electrical interface 1 of the field device 25 and the energy buffer 7 is completely empty. The use of the switch S1 in combination with such a monitoring circuit advantageously prevents the wireless circuit 23 from being operated with too low a supply voltage, i.e. a voltage which is too low for a reliable operation. The problem thereby avoided is that the current flowing in a "half-awake" transition state where the operating voltage is too small can where applicable be so great that the current removed by the wireless circuit 23 in this transition state prevents the energy buffer 7 from ever storing sufficient energy.

This principle is advantageous, in particular, because many wireless circuits 23 support so-called "sleep modes" during which they have a particularly low power consumption.

The solution according to the invention allows an initial "waking" of the wireless circuit 23 to occur when the amount of energy in the energy buffer 7 is high enough to allow a buffering of the current peaks which may be required during the waking process.

As well as using electrolytic capacitors as the energy buffer 7, so-called SuperCaps capacitors are also recommended; they have a particularly high energy density and may not, therefore, be used in the explosion-proof area. A hazard can be excluded by a suitable potting material. Suitable potting materials are, as previously mentioned, potting materials based on silicone, polyurethane and/or epoxy resins. Alternatively electrochemical memories, such as accumulators, can be used as the energy buffer 7.

The wireless circuit 23 is located in FIG. 3 on an SoC printed circuit board or in a so-called "system on chip". A DC converter 12 is inserted between the SoC circuit card and the switch S1. The DC converter 12 is used to increase or reduce the current at the contact element K1 to an operating voltage with which the wireless circuit 23 is operated.

Following the connection to the first input 9 of the comparator 10, the monitoring path P also leads to the connection to the SoC circuit card. The voltage applied to the node 6 can, therefore, be scanned by a monitoring arrangement 13 on the SoC circuit card. In the event of the voltage at the node 6 falling below a prescribed threshold value, the wireless operation is switched off by the monitoring arrangement 13 on the SoC circuit card. In this instance, the energy which is stored in the energy buffer 7 is used up, and the voltage which is applied to the node 6 is no longer kept at a specific voltage level. In this case, the energy in the energy buffer 7 is no longer sufficient for maintaining wireless operation.

A wireless antenna 14 is attached to the SoC circuit card for sending and receiving wireless signals. In so far as this is conductively connected to the energy buffer 7 without other limiting measures such as limiting resistors R1, it must also, just like the energy buffer 7 itself, be encapsulated in a potting compound 17. Otherwise the amount of energy stored in the energy buffer 7 could be discharged via the antenna 14 and give rise to an ignition spark.

The optimum length of the antenna 14 is influenced by the potting encapsulation 17. Accordingly, in comparison with the geometric dimensions required for the wireless frequency, it is geometrically smaller than an antenna 14 found in air. The radiation effect can be negatively influenced by this.

Alternatively, it is possible to prevent the energy in the energy buffer 7 from being discharged via the antenna 14 in that a capacitive isolation 19 from the energy buffer 7 occurs in the connection supply line 24 which connects the wireless circuit 23 to the antenna 14. As a rule, the standards for explosion protection allow an isolation when at least two high-voltage-resistant capacitors 19 are used. This type of capacitor can be used for exchanging the wireless signals between the antenna 14 and the wireless circuit 23, yet despite this, the critical amount of energy contained in the energy buffer 7 cannot cause an ignition. The advantage of using such coupling capacitors 19 is that it is no longer mandatory for the antenna 14 to be encapsulated via potting material 17, like the energy buffer 7 and the wireless circuit 23 connected to the energy buffer 7. This may make possible an improved radiation effect 20 of the antenna 14.

Furthermore, two data transmission lines B, C are connected to the SoC circuit card. The first transmission line B in this embodiment transmits data, which has been received by the antenna and the wireless circuit from the SoC circuit card on the connected field device. The second data transmission line C shown transmits data in the opposite direction, namely from the field device in the direction of the SoC circuit card.

The data transmission lines B, C each have a resistor R2, R3. These are limiting resistors R2, R3 which are used to limit the suppliable current and the power on the data transmission lines B, C. As previously mentioned, this ensures that sparking is avoided, although the level of the output operating current of the field device 25 is markedly reduced, and the signal quality on the data transmission lines B,C is negatively influenced.

The data transmission lines B, C also connect to a level converter 15. The level converter 15, similarly to the DC converter 12, converts the voltage level of the voltage on one of the data transmission lines B, C. The respective operating voltages of the wireless circuit 23 and the electrical interface 1 are thus adjusted to each another. The level converter 15 is also used to filter out various signal interferences from the data signals, which are, for example, created by the limiting resistors R2, R3. The signals emitted by the level converter 15 are, therefore, square wave signals with clean switching edges.

In the case of the embodiment which is shown in FIG. 1 to FIG. 3, the wireless dongle 18 is connected to a two-wire field device 25 by having the four contact elements K1, K2, K3, K4 plugged into a corresponding interface 1. The protective cap 2 of the wireless dongle 18 is then screwed onto a thread provided on the interface 1. In the event that the first contact element is already precharged with a voltage to supply the field device 25 with energy, the energy buffer 7 begins a charging process as soon as the wireless dongle 18 is attached to the field device 25. During this charging process, the amount of energy is not sufficient to reliably wake the wireless circuit 23 from sleep mode. The energy buffer 7 charges until the voltage which is applied to the node 6 exceeds a prescribed threshold. This threshold value is prescribed in dependence on a voltage which is applied to the second input 16 of the comparator 10.

If the voltage at the node 6 (and, therefore, the voltage at the first input 9 of the comparator 10) exceeds this threshold, the output signal 11 of the comparator 10 switches so that the switch S1 is closed. When this switch S1 is closed, an electrical current flows across the first contact element K1 and the first resistor R1 right up to the DC converter 12. The DC converter 12 converts the current to a voltage level which corresponds to the operating voltage of the wireless circuit 23. The wireless circuit 23 is, therefore, supplied with energy and can receive and send out wireless signals. When wireless signals are sent out, it can happen that the wireless circuit 23 has a higher energy consumption than is allowed by the limiting resistor R1 in the supply line E, A.

The energy supply voltage E from the field device 25 can be 3 V, for example. By means of the limiting measures integrated into the field device 25 for ensuring intrinsic safety, a maximum 500 µA is, for example, made available to the wireless dongle 18. However, it is possible that over a period of, for example, 400 µs the wireless circuit 23 requires approximately 12 mA in order to be able to send out wireless signals or to wake the wireless circuit 23. The current limit caused by the limiting resistors R1, R2, R3 complicates this situation even further. Under such circumstances, the energy buffer 7 is used to provide the missing amount of power. If the energy in the energy buffer 7 is reduced such that the wireless circuit 23 cannot send out any wireless signals, the voltage on the node 6 will fall below a prescribed threshold. This is determined via the second monitoring arrangement 13 on the SoC circuit card. As a result, at least the transmission function of the wireless circuit 23 is switched off until the supply voltage is once more sufficient for sending wireless signals 20. Alternatively the SoC circuit card can be put back into sleep mode again until the energy buffer 7 reaches a sufficient filling level.

The second monitoring arrangement 13 thus ensures that, following the initial successful start-up of the wireless circuit 23, the energy buffer 7 is never discharged to a value which prevents a subsequent reliable "waking" of the wireless circuit 23.

The operating voltage can, for example, be 1.8 volts. In the event that the two-wire field device 25 has a different operating voltage, for example 3 volts, the level converter 15 is used to convert 1.8 volt output by the SoC circuit card to 3 volts, and, in the same way, the 3 volt operating voltage of the field device 25 to a 1.8 volt operating voltage for the SoC circuit card or wireless circuit 23. The level converter 15 is also used to compensate the voltage losses via the resistors R2, R3 or to intensify the data transmission signals on the data transmission lines B, C. This is particularly significant for high transmission rates since transmission errors can be avoided as a result.

The invention claimed is:

1. A wireless dongle for an automation field device, in particular a two-wire field device, to connect to an electrical interface of a field device, having:
    a wireless circuit for sending or receiving wireless signals;
    a printed circuit board; and
    a connector element, wherein:
    the wireless dongle can be fitted detachably to the electrical interface by means of said connector element;
    said connector element has several contact elements, said contact elements are attached to said printed circuit board in the wireless dongle;
    a first contact element is used to supply the wireless dongle with energy;
    an energy buffer is provided which is downstream of said first contact element, that said connector element has a second contact element which is used to transmit data between the field device and the wireless dongle;
    at least one limiting resistor is downstream of said first contact element and downstream of said second contact element; and
    said at least one limiting resistor and said energy buffer of the wireless dongle are encapsulated by means of a potting compound.

2. The wireless dongle according to claim 1, further having:
a DC converter which is downstream of said energy buffer, wherein:
said DC converter is used to control the voltage which is made available to said wireless circuit.

3. The wireless dongle according to claim 2, wherein:
the wireless dongle is designed such that a first operating voltage operates said energy buffer, that a second operating voltage operates said wireless circuit, and that said DC converter converts said first operating voltage to said second operating voltage.

4. The wireless dongle according to claim 1, further having:
a first monitoring arrangement monitoring the energy in said energy buffer, wherein:
said first monitoring arrangement has a switch which is initially in an open state between said energy buffer and said wireless circuit, and that the switch is closed when the energy in said energy buffer exceeds a prescribed threshold value.

5. The wireless dongle according to claim 1, further having:
a second monitoring arrangement which monitors the energy supply of the wireless dongle and, in the event that the energy available for operating the wireless operation of the wireless dongle is below a prescribed threshold value, switches off the wireless operation.

6. The wireless dongle according to claim 1, further having:
a third contact element which is part of a second data transmission line which transmits data from the field device to the wireless dongle, and a limiting resistor is downstream of said third contact element, wherein:
said second contact element is part of a first data transmission line which transmits data from the wireless dongle to the field device.

7. The wireless dongle according to claim 6, further having:
a level converter, wherein:
said first data transmission lines on said second and third contact element have a first voltage level, that said first and second data transmission lines on said wireless circuit have a second voltage level; and
said level converter converts the voltage level.

8. The wireless dongle according to claim 7, wherein:
said first operating voltage corresponds to said first voltage level, and said second operating voltage corresponds to said second voltage level.

9. The wireless dongle according to claim 6, further having:
a fourth contact element which is connected to ground, wherein:
said energy buffer is a capacitor;
a first electrode of the capacitor is connected to a node downstream of said first contact element; and
a second electrode of the capacitor is connected to said fourth contact element.

10. The wireless dongle according to claim 1, wherein:
the wireless dongle has a hermetically sealed enclosure and, that said enclosure is at least partially filled with said potting compound.

11. The wireless dongle according to claim 1, further having:
an antenna integrated into the wireless dongle, wherein:
said energy buffer, said wireless circuit and said antenna are all encapsulated via said potting compound.

12. The wireless dongle according to claim 1, further having:
an antenna integrated into the wireless dongle whose antenna feeder is separated from said energy buffer by at least one blocking capacitor, wherein:
said at least one blocking capacitor is encapsulated together with said energy buffer and the wireless circuit via said potting compound.

13. The wireless dongle according to claim 1, further having:
an encryption unit integrated in the wireless dongle which is used to secure said wireless channel against being tapped and/or manipulated.

14. The wireless dongle according to claim 13, wherein:
said encryption unit has a non-volatile memory in which information such as passwords or keys is stored.

* * * * *